(12) United States Patent
Walter et al.

(10) Patent No.: US 10,378,998 B2
(45) Date of Patent: Aug. 13, 2019

(54) CLUTCH WITH WEAR COMPENSATION MECHANISM AND MOTOR VEHICLE HAVING SUCH A CLUTCH

(71) Applicant: ZF FRIEDRICHSHAFEN AG

(72) Inventors: Andreas Walter, Dortmund (DE); Christian Schmedding, Poppenhausen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 134 days.

(21) Appl. No.: 15/602,271

(22) Filed: May 23, 2017

(65) Prior Publication Data
US 2017/0350790 A1 Dec. 7, 2017

(30) Foreign Application Priority Data

Jun. 7, 2016 (DE) ........................ 10 2016 210 012

(51) Int. Cl.
| | | |
|---|---|---|
| *G01M 13/02* | (2019.01) | |
| *G01M 13/022* | (2019.01) | |
| *F16D 13/75* | (2006.01) | |
| *F16D 13/58* | (2006.01) | |
| *F16D 13/70* | (2006.01) | |

(52) U.S. Cl.
CPC ......... *G01M 13/022* (2013.01); *F16D 13/757* (2013.01); *F16D 13/583* (2013.01); *F16D 13/70* (2013.01); *F16D 2300/18* (2013.01)

(58) Field of Classification Search
CPC .............................. G01M 13/022; F16D 13/75

USPC ....................................................... 73/115.04
See application file for complete search history.

(56) References Cited

U.S. PATENT DOCUMENTS

| | | | | |
|---|---|---|---|---|
| 4,189,043 A * | 2/1980 | Steinhagen | ........... | F16D 13/757 188/196 BA |
| 4,934,501 A * | 6/1990 | Gay | ........ | F16D 23/14 192/30 W |
| 5,579,882 A * | 12/1996 | Stuhldreher | .......... | F16D 48/066 192/109 F |
| 5,678,673 A * | 10/1997 | Borschert | ............... | F16D 28/00 192/109 R |
| 5,690,203 A * | 11/1997 | Link | ..................... | F16D 13/757 192/111.3 |
| 5,894,916 A * | 4/1999 | Grupp | .................. | F16D 13/585 192/111.19 |
| 5,941,356 A * | 8/1999 | Weiss | ................... | F16D 13/585 192/109 R |
| 6,021,877 A * | 2/2000 | Weidinger | ............ | F16D 13/757 192/111.3 |
| 6,050,381 A * | 4/2000 | Uehara | ................. | F16D 13/385 192/111.2 |
| 6,094,976 A * | 8/2000 | Hayashi | ................. | F16D 48/06 73/115.04 |

(Continued)

FOREIGN PATENT DOCUMENTS

| | | |
|---|---|---|
| DE | 102015104166 | 9/2015 |
| WO | WO2001/75322 | 10/2001 |

*Primary Examiner* — Eric S. McCall
(74) *Attorney, Agent, or Firm* — Cozen O'Connor

(57) ABSTRACT

A clutch for a motor vehicle with a wear compensation mechanism which includes a sensor element for detecting wear, wherein the sensor element is formed of a plurality of parts, and at least two sensor component parts are rotatably connected to one another.

13 Claims, 4 Drawing Sheets

(56) References Cited

U.S. PATENT DOCUMENTS

| | | | | |
|---|---|---|---|---|
| 6,123,180 | A * | 9/2000 | Weidinger | F16D 13/585 192/111.3 |
| 6,202,811 | B1 * | 3/2001 | Wallrafen | F16D 13/58 192/30 W |
| 6,296,099 | B1 * | 10/2001 | Gochenour | F16D 13/757 192/111.2 |
| 6,325,192 | B1 * | 12/2001 | Reik | F16D 13/585 192/111.19 |
| 6,347,694 | B1 * | 2/2002 | Szadkowski | F16D 13/757 192/111.16 |
| 2006/0009328 | A1 * | 1/2006 | Jung | F16D 48/06 477/176 |
| 2009/0218188 | A1 * | 9/2009 | Dussel | F16D 13/757 192/70.252 |
| 2011/0056790 | A1 * | 3/2011 | Raber | F16D 13/757 192/70.252 |
| 2014/0048376 | A1 * | 2/2014 | Vilkner | F16D 13/757 192/66.3 |
| 2015/0253803 | A1 * | 9/2015 | Weschke | B60T 7/042 74/514 |
| 2017/0307027 | A1 * | 10/2017 | Yucesan | F16D 13/757 |
| 2018/0087582 | A1 * | 3/2018 | Schomig | F16D 13/71 |

* cited by examiner

CLUTCH WITH WEAR COMPENSATION MECHANISM AND MOTOR VEHICLE HAVING SUCH A CLUTCH

BACKGROUND OF THE INVENTION

1. Field of the Invention

The invention is directed to a clutch for a motor vehicle with a wear compensation mechanism which comprises a sensor element for detecting wear.

2. Description of the Related Art

During the life of a clutch, the clutch disk lining inter alia wears so that the engaging position of the diaphragm spring changes. In order to compensate for this wear, it is known to provide a wear compensation mechanism. Wear compensation mechanisms of this kind usually comprise oppositely running ramps, a plurality of ramps usually being arranged one behind the other in circumferential direction. The corresponding oppositely running ramps are then located opposite the first ramps in axial direction.

The wear compensation mechanisms have different devices for detecting wear. In a first wear compensation mechanism, a blocked slide is released when the sensor, which is formed as a pin, lifts the blocking element from the slide.

In another wear compensation mechanism, a drive pawl drives a spindle drive in that it moves a pinion when a predetermined wear is present. The driving pawl is the sensor for sensing wear.

Owing to the structural configuration of the sensor, the displacing mechanism for displacing one of the ramp units is complicated and expensive.

In view of the foregoing, it is an object of the present invention to provide a clutch with a wear compensation mechanism which can be produced more economically.

SUMMARY OF THE INVENTION

To meet this object, it is provided that the sensor element is formed of a plurality of parts, and at least two sensor component parts are rotatably connected to one another.

It may be viewed as the core of the invention that while the sensor element is constructed in a slightly complicated manner, other parts of the wear compensation mechanism can be constructed in a simpler manner which more than makes up for the complicated construction of the sensor element. An achievement of this construction of the sensor element consists in particular in that the detection or the effect of wear does not take place in axial direction but rather in circumferential direction.

The sensor element can preferably have exactly two component parts. These are rotatably connected to one another as was described. It is further preferable that the sensor elements are connected to one another at one of their respective ends. In principle, the sensor elements could also be connected to one another in a cross-shaped manner. However, connecting two ends requires minimal installation space.

The sensor component parts can preferably form a knee lever or toggle lever. The tip of the knee lever preferably faces in the direction of the clutch housing; in other words, the tip of the knee lever preferably faces in axial direction. The base, i.e., the two free ends of the knee lever, preferably face in the direction of a pressure plate.

The sensor component parts can preferably be constructed in a bar-shaped or plate-shaped manner. This makes the sensor component parts simple to produce.

A sensor component part can preferably be fastened to a pressure plate of the clutch. In particular, the sensor component part can be rotatably fastened. Usually, the sensor elements are not fastened to the pressure plate because the drive for displacing the ramp units is fastened to the pressure plate and during a sensing of wear in axial direction a displacement of the sensor relative to other component parts or relative to component parts of the wear compensation mechanism which cooperate with the latter is then only possible when the sensor element is fastened to the clutch housing, for example. However, by reason of this arrangement it is possible to leave the other clutch components unaltered.

In an advantageous manner, a drive element for displacing at least one element compensating for wear can be fastened to a sensor component part. In particular, the drive element can be rotatably fastened. As has already been described, owing to the fact that the sensor element is formed of two or more parts, it is possible to redirect the sensing of wear from the axial direction into the circumferential direction. Accordingly, the drive element can be fastened directly to the sensor element and, at that location, to the sensor component part thereof with its free end. In this way, no blocking element is needed, for example, but also a pawl need not cooperate with a pinion to drive a spindle drive. In this way, the sensor element and the drive unit are merged and, as a totality, have only essentially three simple component parts to which, for example, the fastening elements for the rotatable fastening are then also added.

Two sensor component parts can preferably be loaded by preloading. The preloading can be tensile in particular. For example, a spring can be used for this purpose. As a result of the preloading, the sensor element is brought into a basic position so that after wear has been sensed or after any movement of the sensor at all, an initial position can be reestablished.

The wear compensation mechanism can advantageously have two oppositely running ramp arrangements. As has already been described above, every ramp arrangement can comprise a plurality of ramps arranged one behind the other in circumferential direction. The wear compensation is produced through displacement of the ramp arrangements relative to one another. In this respect it is known, for example, to form a ramp arrangement integral with the pressure plate and to configure the second ramp arrangement so as to be displaceable relative to the former ramp arrangement. However, both ramp arrangements can also be formed as ramp rings.

Further, a ramp can be arranged at the sensor surface of the sensor element. The sensor surface of the sensor element is formed in particular via the fastening of the sensor component parts. In other words, this can be the knee of the knee lever. In particular, the ramp is arranged in such a way that it reduces the distance of the sensor surface from the opposing surface with increasing wear. When the ramp is suitably configured, housing wear can accordingly be sensed. The sensor then serves not only for sensing lining wear but also housing wear.

The sensor element can advantageously sense the distance between pressure plate and diaphragm spring. This also means, in other words, that the work angle of the diaphragm spring is sensed. In so doing, the minimum distance between diaphragm spring and pressure plate is sensed in particular and a wear compensation is carried out when the distance falls below a minimum distance which is not met due to constructional factors.

A guide rail for guiding the sensor element can preferably be arranged at a pressure plate of the clutch. This serves to stabilize the sensor element which is formed of multiple parts as was described.

The clutch can advantageously have a pressure plate which is fastened to leaf springs at the clutch housing.

The clutch can advantageously have an energy accumulator or lever element, particularly a diaphragm spring. In the first case, it is a normally closed clutch; in the second case, it is a normally open clutch.

In addition, the invention is directed to a motor vehicle with a clutch. The motor vehicle is characterized in that the clutch is constructed in the manner described above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further advantages, features and details of the invention are indicated in the following description of embodiment examples and drawing figures in which.

DETAILED DESCRIPTION OF THE PRESENTLY PREFERRED EMBODIMENTS

Figure 1:
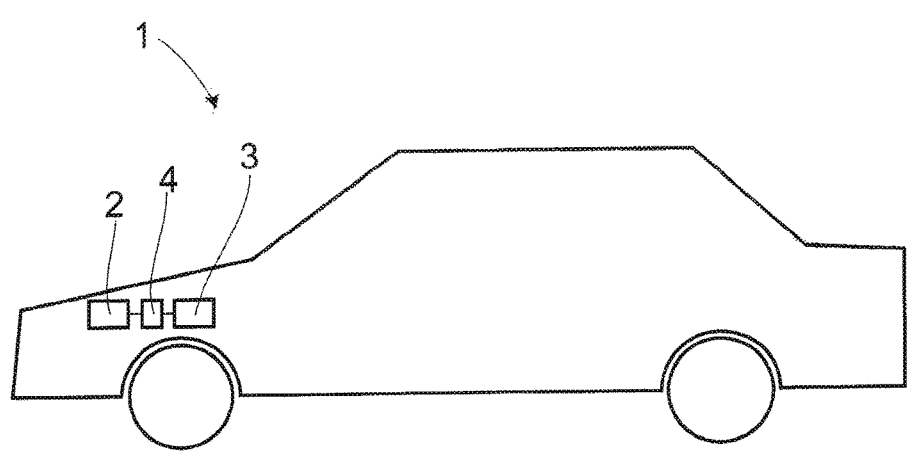
FIG. 1 is a schematic view of a motor vehicle.

FIG. 1 shows a motor vehicle 1 with a drive unit 2, a transmission 3 and a clutch 4 arranged between drive unit 2 and transmission 3. The drive unit 2 can be an internal combustion engine or an electric motor. The connection of the drive unit 2 to the transmission 3 can also be such that the drive unit 2 is an auxiliary drive, i.e., such that further drive units and clutches can exist. The motor vehicle 1 can have a powertrain with an internal combustion engine, a hybrid drivetrain or a purely electrical drivetrain. Further, the described wear compensation mechanism can also be used in dual clutches or multiple-disk clutches, provided they have pressure plates.

Figure 2:
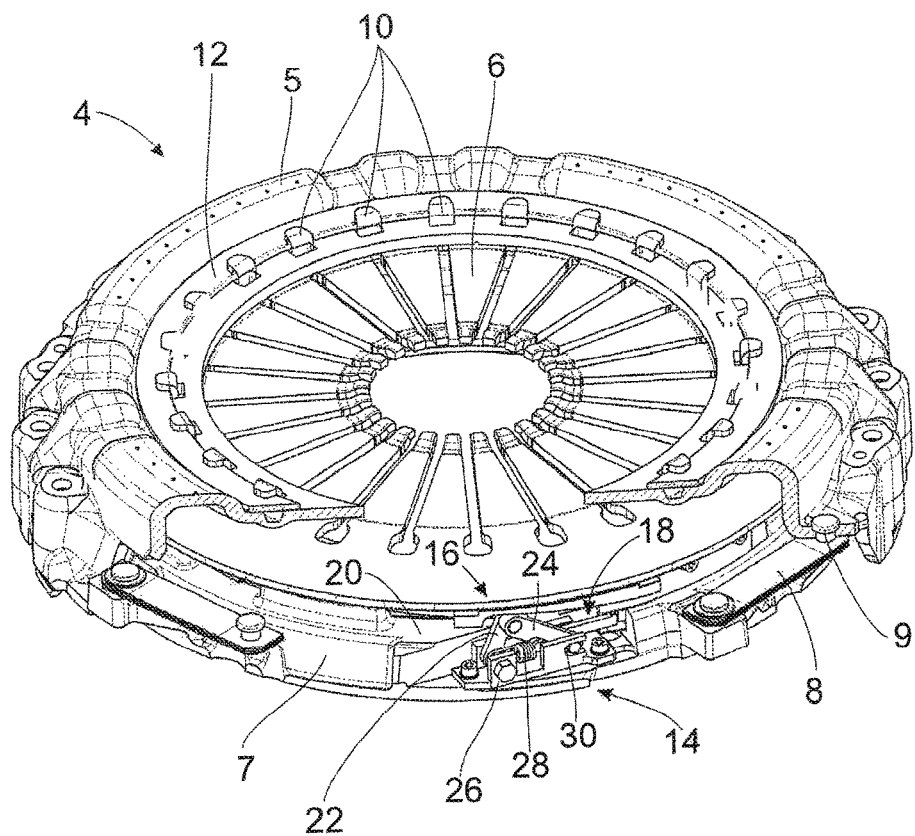
FIG. 2 is a perspective and partial cross-sectional view of a clutch of the present invention.

FIG. 2 shows the clutch 4 in detail. The clutch 4 has as basic component parts the clutch housing 5, a diaphragm spring 6 and pressure plate 7. The pressure plate 7 and the clutch housing 5 are connected to one another via leaf springs or leaf spring packages 8 so as to be rotatable and axially movable. The leaf spring packages 8 are fastened to the clutch housing 5 and the pressure plate 7 by rivets 9.

The diaphragm spring 6 is supported at the clutch housing 5 via spacer bolts 10 which are fastened by a retaining ring 12.

Further, the clutch 4 comprises a wear compensation mechanism 14.

A wear compensation mechanism 14 usually comprises a sensor element 16, a drive unit 18 and a compensation mechanism 20 which cooperate in the following manner:

The sensor element 16 senses wear of the clutch disk lining so that the drive unit 18 is activated, which generally causes a displacement of the compensation mechanism 20 when a threshold value is exceeded so that the wear, for example, wear of the clutch disk lining, is compensated.

The wear mechanism usually comprises two ramp arrangements with oppositely running ramps.

The sensor element 16 which is constructed of one part in known wear compensation mechanisms is formed of two parts in wear compensation mechanism 14 and comprises sensor component part 22 and sensor component part 24.

Sensor component part 22 is fastened to pressure plate 7, specifically via the guide rail 26. The movement of the sensor component part 24 can be controlled in particular via the guide rail.

Sensor component part 22 and sensor component part 24 are pretensioned by springs 28. In this way, the sensor element 16 in the form of sensor component parts 22 and 24 obtains a basic position. This basic position is defined by a stop 30 at the guide rail 26.

Sensor component part 22 and sensor component part 24 form a knee lever or toggle lever 32 whose knee 34 faces in axial direction of the clutch housing 5 or of the diaphragm spring 6 and whose base 34a, 34b faces in the direction of the pressure plate 7.

Sensor component parts 22 and 24 are constructed in a bar-shaped manner.

The drive unit 18 of the wear compensation mechanism 14 merely comprises a tie rod 36 which is rotatably fastened to sensor component part 24 and which slides along one of the ramp rings 38 of the compensation mechanism 20.

Figure 3:
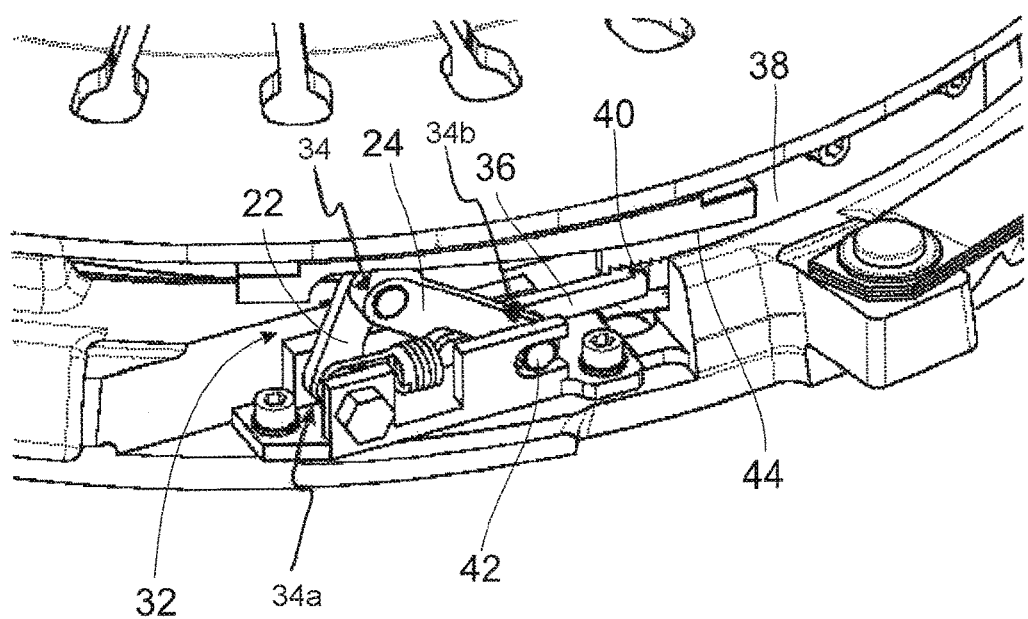
FIG. 3 is a sectional view of the clutch of the present invention.

The functioning of the wear compensation mechanism 14 will be described with reference to FIG. 3. When engaging, the outer part of the diaphragm spring moves in the direction of the pressure plate 7. This is always the case when the clutch 4 is constructed as a so-called pressed clutch. The greater the wear, or in the presence of wear, the distance between diaphragm spring 6 and pressure plate 7 becomes smaller so that sensor component parts 22 and 24 are pressed apart at the base, i.e., at the ends facing the pressure plate 7. They are rotatably fastened to the knee 34 and cannot move away from one another. The smaller the distance between diaphragm spring 6 and pressure plate 7, the farther the tie rod 36 is rotated counterclockwise in circumferential direction. The wear compensation mechanism can, of course, also be constructed in a mirror-inverted manner, and the movement in counterclockwise direction is therefore purely exemplary. When a wear which can be predetermined via the lengths of sensor component parts 22 and 24 is exceeded, the tie rod 36 reaches the next teeth 40 which are fixedly connected to the ramp ring 38. The teeth 40 can be worked into the ramp ring 38 directly, but they can also be located on a plate which is fixedly connected to the ramp ring 38, for example. In any case, the tie rod 36 hooks into the next tooth 40 when a predetermined path has been exceeded. During the next disengagement of the clutch 4, the ramp ring 38 is released and can be moved in clockwise direction by spring 28 until the knee lever 32 is again in the basic position.

Accordingly, the connection element 42 between sensor component part 24 and tie rod 36 serves a dual function because the sensor component part 24 acts as a guide and at the same time acts as a stop.

Further, a ramp 44 which forms the opposing surface of the sensor surface of the knee lever 32 is fastened to the ramp ring 38. The ramp 44 is not compulsory, the knee 34 can also sense wear directly at the diaphragm spring 6. Accordingly, the sensor surface is the knee 34 which comes in contact with ramp 44 when the diaphragm spring 6 moves toward the pressure plate 7. Ramp 44 is connected to ramp ring 38 so as to be fixed with respect to rotation relative to it so that during rotation of the ramp ring 38 ramp 44 is rotated by the same degree. Housing wear is included in the overall compensation by ramp 44. The wear compensation mechanism 20 can then compensate not only for lining wear but also housing wear.

Figure 4:
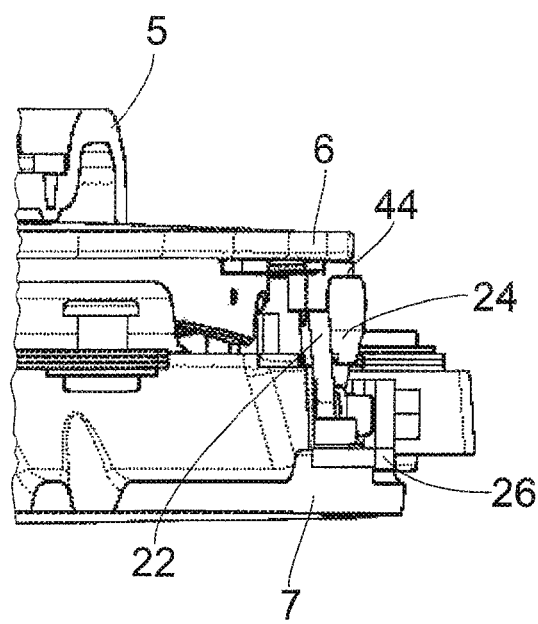
FIG. 4 is a partial cross-sectional view of the clutch of the present invention.

FIG. 4 shows the wear compensation mechanism and a portion of the clutch 4 in cross section. The guide rail 26, sensor component parts 22 and 24 and ramp 44 can be seen.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A clutch (4) for a motor vehicle (1) comprising:
   a wear compensation mechanism (14) comprising a sensor element (16) for detecting wear, the sensor element (16) is formed of a plurality of sensor component parts;
   wherein at least two sensor component parts (22, 24) are rotatably connected to one another;
   wherein the sensor component parts (22, 24) form a knee lever (32) having a knee (34); and additionally comprising a displaceable ramp (44) arranged at the sensor surface of the sensor element (16).

2. The clutch according to claim 1, wherein the sensor element (16) has two sensor component parts (22, 24).

3. The clutch according to claim 1, additionally comprising a clutch housing (5) and wherein the knee (34) of the knee lever (32) faces in the direction of the clutch housing (5).

4. The clutch according to claim 1, wherein the knee lever (32) comprises a base 34a, 34b facing in direction of a pressure plate (7).

5. The clutch according to claim 1, wherein the sensor component parts (22, 24) are constructed in a bar-shaped or plate-shaped manner.

6. The clutch according to claim 1, wherein one sensor component part (22) of the two sensor component parts (22, 24) is fastened to a pressure plate (7) of the clutch (4).

7. The clutch according to claim 1, wherein two sensor component parts (22, 24) are loaded by pretensioning.

8. The clutch according to claim 1, wherein the wear compensation mechanism (14) comprises two oppositely running ramp arrangements (38).

9. The clutch according to claim 1, wherein the sensor element (16) senses a change in the distance between a pressure plate (7) and a diaphragm spring (6).

10. The clutch according to claim 1, additionally comprising a guide rail (26) for guiding the sensor element (16), the guide rail being arranged at a pressure plate (7) of the clutch (4).

11. The clutch according to claim 1, additionally comprising at least one element (38) compensating for wear and a drive element (36) for displacing the at least one element (38); the drive element (36) being fastened to a sensor component part (24).

12. The clutch according to claim 11, wherein the drive element (36) is rotatably fastened to the sensor component part (24).

13. A motor vehicle (1) having a clutch (4) comprising:
   a wear compensation mechanism (14) comprising a sensor element (16) for detecting wear, the sensor element (16) is formed of a plurality of sensor component parts;
   wherein at least two sensor component parts (22, 24) are rotatably connected to one another;
   wherein the sensor component parts (22, 24) form a knee lever (32) having a knee (34); and additionally comprising a displaceable ramp (44) arranged at the sensor surface of the sensor element (16).

* * * * *